Aug. 18, 1953     A. A. MILLER     2,648,892
RECIPROCATING POWER TOOL
Filed Nov. 19, 1948     2 Sheets-Sheet 2
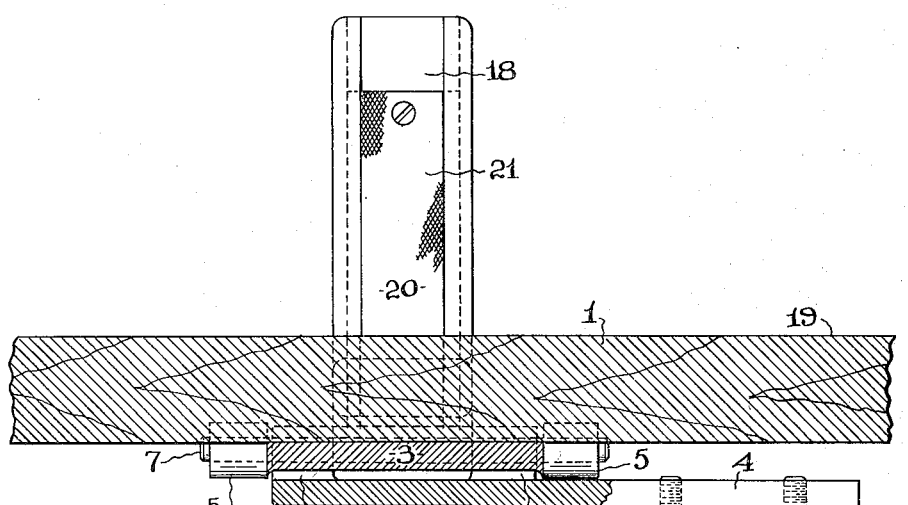
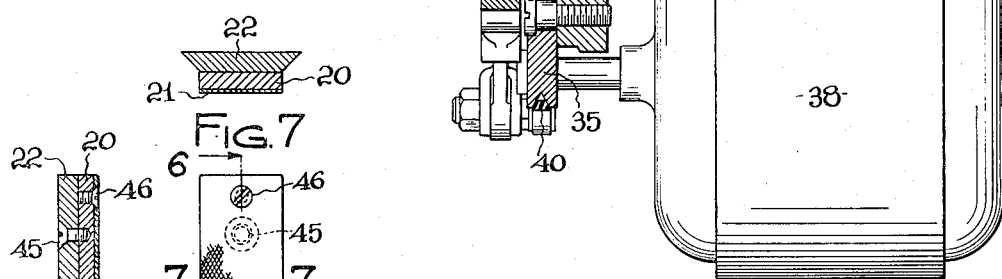
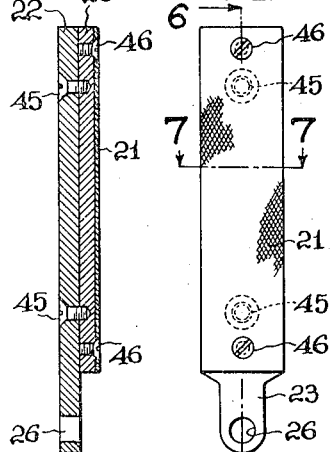
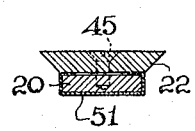
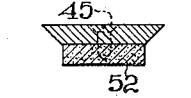
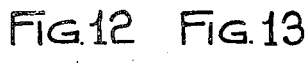
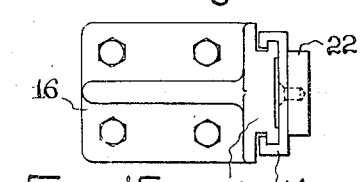
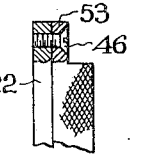
INVENTOR.
ALFRED A. MILLER
BY
Harry P. Canfield
ATTORNEY Patented Aug. 18, 1953

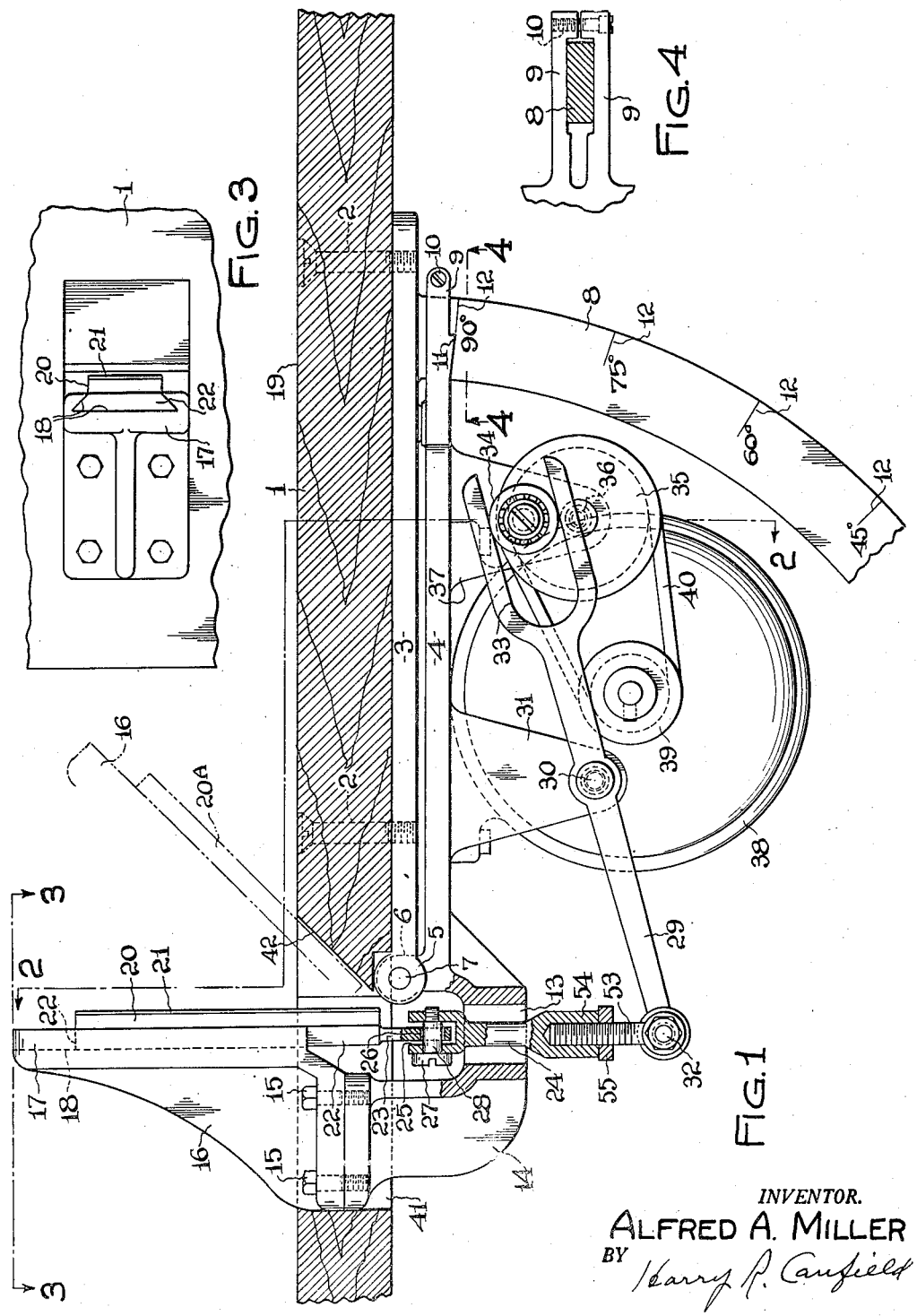

2,648,892

UNITED STATES PATENT OFFICE 2,648,892

RECIPROCATING POWER TOOL

Alfred A. Miller, Cleveland, Ohio

Application November 19, 1948, Serial No. 61,053

2 Claims. (Cl. 29—76)

This invention relates to motor driven machine tools, in which the tool proper has a rectilinear reciprocatory movement.

Machines have been proposed in which a tool having an abrasive or filing or other cutting surface is reciprocated rectilinearly through an opening in a work table by the power of a motor under the table; and, in operation, a work piece is laid on the table and move manually into engagement with the tool; and the manual pressure of the work piece against the tool causes it to be worked by the reciprocating movement of the tool.

The present invention relates generally to this class of machine tools.

In all such machine tools of which I have knowledge, the reciprocating tool is supported at a point below the work table where the reciprocating movement is imparted to it; and its free reciprocating end portion above the work table where pressure of the work comes upon it laterally, is not supported or backed up in opposition to the manual pressure.

This arrangement has a number of disadvantages. For example, there is a low limit to the amount of working pressure that can be put on the tool, because the work pressure tends to bend or spring the tool out of its rectilinear line of reciprocation; and the cutting or abrading by the tool must therefore be kept down to a low inefficient rate to be accurate.

Attempts have been made to overcome this defect by adding rigidity to the connection between the tool and its driving mechanism; and by making the tool itself rigid; but this leads to excess weight and an unduly large expensive machine.

As another disadvantage, the tool is reciprocated by a power connection to one end only, that to its lower end under the table; and this connection must not only reciprocate the tool but must hold it upright and in a rectilinear line of movement; and this leads to complications in the mechanism, excess friction and wear, power loss, etc.

Again, because of utilizing a connection between the tool and its driving mechanism which both reciprocates the tool and holds it upright, different kinds of tools are not readily interchangeable on the machine; and the kinds or varieties of work which can be performed by the tool are therefore limited.

It is with these and other objections to prior machines in mind that the present invention has been made.

The principle of the invention may be embodied in a variety of structures. While the invention itself is set forth in the appended claims, the embodiment of the invention chosen for illustration herein comprises generally speaking: a rigid rectilinear guideway above the table; a tool base reciprocable in and guided independently of other mechanisms by the guideway; a corresponding reciprocatory driver under the table; a simple detachable connection between the tool base and the driver; a motor for reciprocating the driver; the tool base being equipped with a variety of readily detachably interchangeable work tools; and being itself readily detachable to interchange it with other tool bases; and preferably the tool is made adjustable in position to reciprocate at right angles to the table or at any desired angle within a range of angles.

The objects of the invention are to provide a machine which overcomes the objections to prior machines, some of which are mentioned above; and to provide a machine having some or all of the features mentioned above as being in the preferred embodiment.

Other objects will become apparent to those skilled in the art from the following description taken in connection with the accompanying drawing in which:

Fig. 1 is a side elevational view, with parts broken away and parts in section of an embodiment of the invention mounted on a work table;

Fig. 2 is a sectional view from the plane 2—2 of Fig. 1;

Fig. 3 is a partial top plan view taken from the plane 3—3 of Fig. 1;

Fig. 4 is a fragmentary sectional view from the plane 4—4 of Fig. 1;

Fig. 5 is a front elevational view showing separately a tool of Fig. 1;

Fig. 6 is a longitudinal sectional view from the plane 6—6 of Fig. 5;

Fig. 7 is a cross sectional view from the plane 7—7 of Fig. 5;

Figs. 8, 9, 10, 11, 12, and 13 are views similar to Fig. 7 but illustrating modifications;

Fig. 14 is a fragmentary side elevational view of a part of the upper portion of either of Figs. 9, 10, 12, or 13;

Fig. 15 is a view similar to Fig. 3 but showing a modification.

Referring to the drawing which illustrates one of several possible embodiments of the invention, there is shown at 1 a work table, which may be of wood or metal; and secured to the underside of the work table 1 by screws 2—2, is a main base 3, preferably of cast metal, having at its left end as viewed in the drawing a hinging connection with a sub-base 4, also preferably of cast metal, the hinging connection comprising ears 5—5 on the main base 3 and ears 6—6 on the sub-base 4 and a pin 7 going therethrough.

The main base 3 has an arcuate horn 8 depending therefrom, generally concentric with the axis of the hinge pin 7.

The sub-base 4 lies under the main base 3 and has fingers 9—9 embracing the horn 8 and lying close to its opposite sides; and by means of a screw 10, the fingers may be drawn together to clamp the horn 8 therebetween; the fingers 9—9 being long enough so that the normal resilience of the cast metal will allow for the clamping action of the fingers, and also to allow the sub-base 4 to be hingingly moved on the pin when the clamping action is released; whereby the sub-base 4 may be moved to and clamped in different angular positions; the positions being accurately determined by a pointer or shoulder 11 on one of the fingers 9, and degree marks 12—12 for 90°, 75°, 60°, etc., inscribed on the horn 8 as shown, and for registering with the shoulder 11.

The sub-base 4, to the left of the hinge pin 7 as view in Fig. 1, has an opening 13 therethrough; and beyond the opening has an arm 14 extending upwardly; and mounted on the arm 14 by screws 15—15 is a bracket 16, preferably of cast metal, on which is formed a rectilinear tool guideway 17.

The arm 14 and bracket 16 may be in one piece, but I prefer to make them separate and fasten them together to facilitate manufacture.

The guideway 17 on the bracket 16 in the form shown in Figs. 1, 2, and 3, comprises a concave dove-tail groove 18, which is at right angles to the base 3, and therefore at right angles to the top 19 of the work table 1; and at the time of inscribing the degree marks 12—12 on the horn 8, this right angle relation is first accurately established so that when the sub-base 4 is locked in its different indicated angular positions, the guideway 17 will take up corresponding accurate angular positions with respect to the work table top 19, or with respect to the plane at right angles to the table top.

A tool indicated generally at 20 is mounted on a tool base 22 (these parts to be more fully described later); and the tool base 22 is of dove-tail form to slidingly fit in and be guided for rectilinear reciprocatory movement in the guideway groove 18.

The tool base 22 has an extension 23 extending downwardly therefrom, which at its lower end is connected to an elongated longitudinally reciprocable element or driver 24 extending through the opening 13. Means to be described reciprocates the driver 24 to drive the tool.

The said connection may be variously formed, and it is desirable for it to be a universal movement connection and one readily detachable; so that while the reciprocatory driver 24 is generally aligned with the tool base 22, accuracy of alignment will be unnecessary, and so that the tool base 22 may readily be detached at the connection to interchange it with other tool bases.

In the form of connection illustrated, the reciprocatory driver 24 has a slot 25 in its upper end. The extension 23, see Figs. 1, 5, 6, and 7, is flat and loosely fits in the slot 25 and has a bored hole 26 near its lower end. A screw 27 is projected through one side of the driver 24, across the slot 25 and through the hole 26 and has a round body 28 fitting the hole 26, and is screwed into the other side of the driver 24 beyond the slot 25.

By this construction, when the driver 24 is reciprocated, it communicates reciprocatory movement to the tool base 22, but the tool base movement is guided solely by the guideway groove 18, and accurately as referred to, and independently of the line of movement of the driver 24.

To reciprocate the driver 24, various means may be provided, that shown comprising a rocker 29 pivoted at an intermediate point as at 30 by a pin bearing upon a post 31 on the sub-base 4; and connected at one end by a pin or ball bearing 32 with the lower end of the driver 24; and at its other end having a fork 33 embracing a roller 34 mounted on a belt pulley or wheel 35 at one side of the rotational axis of the wheel; the wheel 35 being mounted on a bearing 36 on a post 37 on the sub-base 4.

A motor 38 is mounted on the sub-base 4 and has a belt pulley 39 on its shaft and by means of a belt 40 drives the wheel 35.

The rocker 29 is thus oscillated by the motor 38 and reciprocates the driver 24 and the tool base 22.

In operation, with the motor 38 running and the cutting tool 20 reciprocating, work is placed on the work table top 19 and pushed by hand against the tool. The tool is backed up by the rigid bracket 16 supporting the tool guideway 17, and therefore is unyielding under the manual pressure of the engagement; and the tool therefore always moves in the same rectilinear path regardless of the pressure on it, and the tool can be forced to cut the work at a high rate and with perfect accuracy.

As illustrated in Fig. 1, the arm 14 and bracket 16 are disposed in a slot or aperture 41 in the end of the work table 1. Obviously, they may simply overhang the end of the work table or may project through a slot in the end of the table.

The tool 20 may be of any suitable length, up and down, to be guided in a stable manner, and its lower end preferably projects downwardly below the table top and into the slot 41 for obvious reasons.

By means of the angular adjustment of the sub-base 4 and the parts carried thereby as described, the tool 20 may be tilted out of the 90° position shown, to an angular position to work at preselected angles on the work as indicated in dotted lines at 20A for one such position; and the table may be cut away by a notch as at 42 to clear the tool.

While I prefer the guideway groove 18 to be a concave female groove with a male dove-tail on the tool base 22, these may be reversed to have the male part on the bracket 16 and the female part on the tool, and both parts may be rectilinear in cross section as shown in the modification of Fig. 15, where the guideway is shown at 43 and the tool base at 44.

As to the tool 20 of Fig. 1, it is shown separately in Figs. 5, 6, and 7. The tool proper, 20, is in the form of a plate or body mounted on the tool base 22 by screws 45—45. The cutting part of the tool, 21, is in the form of a thin file, mounted on the tool by screws 46—46. The file 21 may be renewed at any time or exchanged for a coarser or finer one, by means of the screws 46. The body 22 or tool proper itself can if desired be a file; and to renew it, the tool base 22 is taken out of the guideway 17 after removing the screws 27, Fig. 1, to give access to the screws 45—45.

The entire tool 22—20—21 as a whole can be interchanged for a different type or form of tool without disturbing its assembly, by removing the connection screw 27, withdrawing the tool upwardly out of its guideway 17 and substituting another one.

Modifications of the tool are shown in Figs. 8 to 13 inclusive.

The tool of Fig. 9 has an angle file 47 for cutting or finishing a groove with dihedral angle walls; that of Fig. 10 has a file 48 for cutting or finishing a round groove; that of Fig. 13 has a file 49 for cutting or finishing an angular rib; that of Fig. 12 has a file 50 for cutting or finishing a rectangular groove.

The tool of Fig. 8 has emery paper or sand paper 51 wrapped around the body 20 and clamped between it and the tool base 22 by the screws 45—45.

In Fig. 11, the tool has a lap, or an abrasive stone 52 for grinding, or lapping, or honing.

From these illustrated forms and types of tool, it will be apparent that a great variety of tools, of different shapes and materials, for cutting, filing, abrading, honing, etc., may be provided to work metal, wood, plastics, ceramics, etc.

In the forms of tool of Figs. 9 to 13, the upper and lower ends of the working part of the tool (47, 48, 52, 50, 49 respectively) is preferably provided with a flange 53 as shown in Fig. 14 for the upper end, by which the screws 46 may attach it to the tool base 22.

It will be seen therefore that a part of the invention resides in an improved machine for operating a reciprocatory tool; and that a part resides in improvements in the tool made possible by the machine, including the quick interchangeability of working surfaces on a given tool by the screws 46 and the quick interchangeability of different complete tools by the connecting screw 27.

It may sometimes be desirable to adjust the working zone of the tool to adapt it to different work pieces, and this may be done, as will be understood, by changing the length of the driver 24. To this end, the driver is shown in two parts, 53 and 54, one screwed upon the other, by rotating the part 54 after removing the connection screw 27, and the length adjustment thus effected may be fixed by a lock nut 55.

The invention is not limited to the exact details of construction shown and described. Changes and modifications may be made and all of the same that come within the scope of the appended claims are comprehended by the invention.

I claim:

1. A machine tool comprising a main base adapted to be secured to the underside of a work table; a sub-base hingingly connected to the main base; a rigid rectilinear guideway supported rigidly by the sub-base and extending generally upwardly therefrom beyond the table top; a tool reciprocable on and guided for rectilinear movement by the guideway; the tool having a working surface laterally opposite to the guideway, a motor carried by the sub-base; a power transmitting connection between the motor and the tool to reciprocate the tool; means to lock the sub-base to the main base in different hingingly moved positions of the sub-base; the hinging connection disposed to cause the guideway and tool to take up corresponding different angular working positions with respect to the work table top.

2. A machine tool comprising a main base adapted to be secured to the underside of a work table; a sub-base hingingly connected to the main base; a rigid rectilinear guideway supported rigidly by the sub-base and extending generally upwardly therefrom beyond the table top; a tool reciprocable on and guided for rectilinear movement by the guideway; the tool having a working surface laterally opposite to the guideway; a motor carried by the sub-base; a power transmitting connection between the motor and the tool to reciprocate the tool; lock means to lock the sub-base in selected hingingly moved positions; the hinging connection disposed to cause the guideway and tool to take up corresponding selected angular working positions with respect to the work table top.

ALFRED A. MILLER.

References Cited in the file of this patent
UNITED STATES PATENTS

| Number | Name | Date |
|---|---|---|
| 373,203 | Schreidt | Nov. 15, 1887 |
| 1,898,956 | Harvie | Feb. 21, 1933 |
| 2,114,994 | Brickner | Apr. 26, 1938 |